Jan. 2, 1968 D. G. KINDERSLEY 3,361,048

INDEXED PRINTED MATERIAL

Filed Aug. 19, 1965 2 Sheets-Sheet 1

INVENTOR
DAVID GUY KINDERSLEY

Inventor:
David Guy Kindersley

Watson, Cole, Grindle & Watson
attorneys

United States Patent Office 3,361,048
Patented Jan. 2, 1968

3,361,048
INDEXED PRINTED MATERIAL
David G. Kindersley, Dales Barn, Barton, Cambridge, England
Filed Aug. 19, 1965, Ser. No. 481,123
5 Claims. (Cl. 95—85)

This application is a continuation-in-part of application S. No. 338,714 filed Jan. 20, 1964, which is itself a continuation-in-part of application S. No. 212,642 filed July 26, 1962 (now abandoned).

The invention relates to printing processes and has particular reference to a method of spacing characters for use in printing processes, and to the products of the method.

In known printing processes each set of characters (e.g. an alphabet in Times print) which it is desired to reproduce must be spaced by eye individually. The spacing by eye of a set of characters is a long and arduous task.

It is an object of the invention to provide a method of spacing characters in which it is necessary to space by eye only an arbitrary set of characters and to space any desired set of characters from the results obtained from the arbitrary set.

The invention provides a method of spacing a set of characters for use in printing processes which comprises the step of determining the lateral space value of each character of an arbitrary set of characters, measuring the amount of light (i.e. the light value) passing through a transparent image of each arbitrary character, tabulating or plotting the light values against the space values for the set of arbitrary characters and, for each character it is desired to space, measuring the light value in a similar manner and determining the lateral space value for that character by reading off the corresponding space value from the tabulated or plotted values.

If desired the space values read off from the table or graph may be each increased or decreased by a constant. If a graph is used it is sometimes more convenient to use logarithmic graph paper.

The lateral space value of each character of the arbitrary set of characters is conveniently determined by eye, a convenient method for doing this being described herein.

In one embodiment the light value is measured by placing a transparent image of the character transversely to a beam of light of which the intensity increases at least laterally of the character from both sides of a centre having a minimum amount of light, or no light, the image being placed or adjusted in the beam so that equal amounts of light pass through the image on either side of the centre of the beam (i.e. with its optical centre at the centre of the beam), and measuring the amount of light passing through the image with a light sensitive device.

If desired the intensity of the beam may increase in all directions from the centre.

Preferably the varying intensity of the beam is produced by means of a light wedge.

Conveniently the light values may be plotted against the space values on a graph.

In a further embodiment the lateral space value of an arbitrary character is determined by placing on one side of the arbitrary character two characters spaced apart by a fixed spacing and then moving the said two characters as a unit laterally of the arbitrary character until the centre character of the three characters appears, to the eye, to be equally spaced between the other two characters, repeating the operation with the said two characters on the other side of the arbitrary character and with the said two characters reversed (i.e. with the same character adjacent the arbitrary character) and determining the lateral space value from the distance between the two positions of the character adjacent the arbitrary character.

Preferably the heights of all the characters are the same, with or without ascenders and descenders.

The invention also provides character-bearing parts for use in printing processes, the parts each having at least one character-bearing face, the faces being of widths bearing a constant relation to the lateral space values of their respective characters which values have been determined by a method as described above.

The constant relation may be a constant proportion with or without a constant addition.

Preferably the optical centre of each character is midway along the width of the respective face.

It is also preferred that the character bearing faces are of equal heights.

The invention includes printed or other character-bearing matter when produced by the method or by the parts as described above.

A specific example of a method of spacing characters according to the invention and of the products of the method will now be described with reference to the accompanying drawings, in which.

(FIGURES 9 to 11 refer to an application of the invention and are referred to later herein.)

The first step is to space by eye an arbitrary set of characters, which in this example is an arbitrary alphabet.

Figures 1, 2, 3, 4, 5, 6, 7, 8:
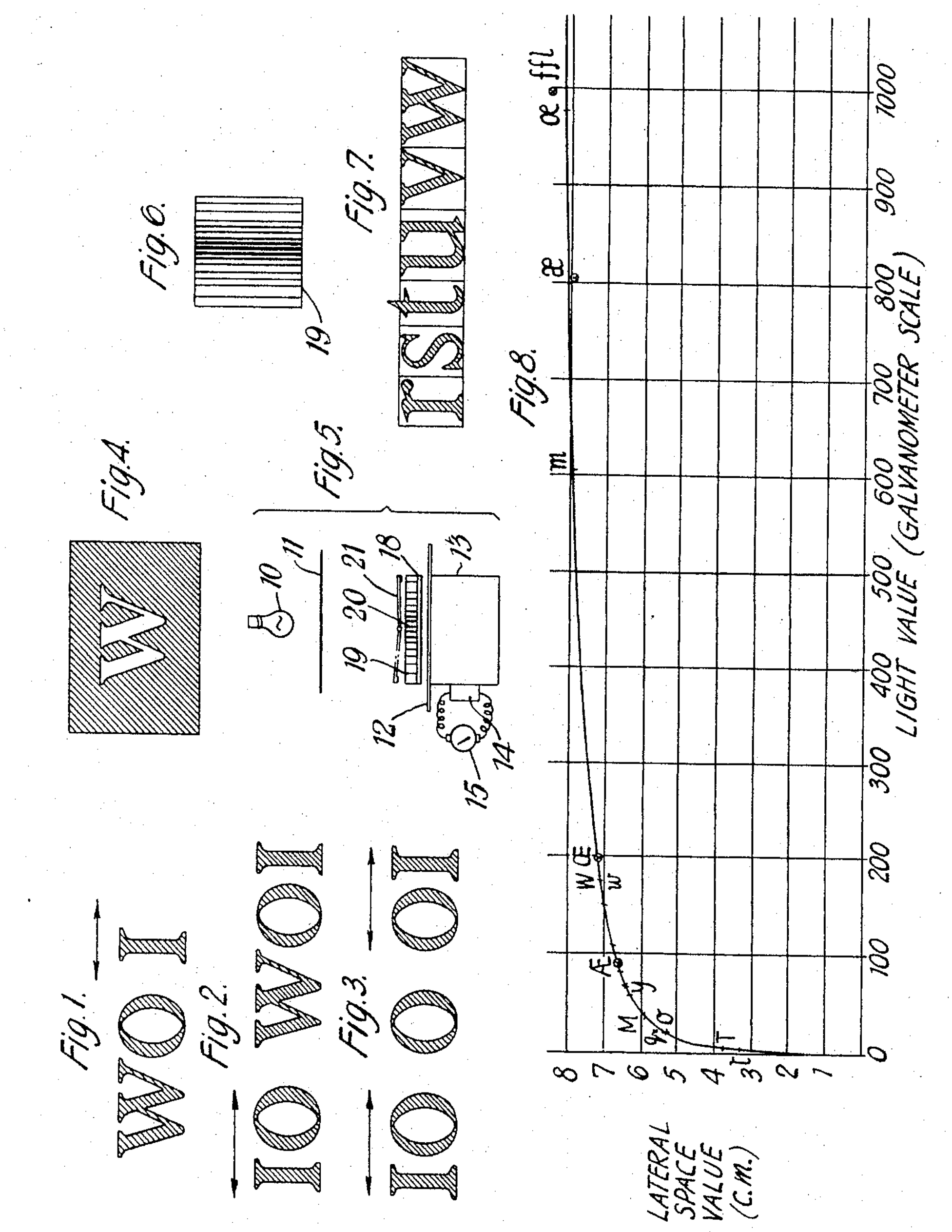
FIGURES 1 to 3 illustrate the determination of the lateral spacing values of the characters.
FIGURES 4 to 6 illustrate the determination of the light values of the characters.
FIGURE 7 shows a line of letters spaced by the method.
FIGURE 8 shows a graph of lateral space values plotted against light values.

This is done by first taking widest character of the set (this may be "ffl," "oe," "w" etc.) which is a "W" in this example and placing an "O" of the same set on one side of the "W" at a convenient spacing distance from the "W." An I of the same set is placed on the side of the O remote from the W as shown in FIGURE 1 and is then moved laterally of the O until the O appears to the eye to be equally spaced between the I and the W.

When this has been done a second O and I, spaced apart by the value which has been fixed for the first O and I, are placed on the other side of the W with the O nearer the W as shown in FIGURE 2. The second O and I are now moved as a unit laterally of the W until the O appears to the eye to be equally spaced between the I and the W.

The distance between the centre of the two O's is now measured.

A letter O is now placed between the two sets of O's and I's and each set in turn is moved as a unit (having the same fixed distance as before between the I and the O) until the two O's of the units each appear to the eye to be equally spaced between the central O and their respective I's. The distance between the centres of the two outer O's is measured and this distance is twice the lateral space value for the letter O (measured in terms of the set distance between O and the I).

From this measurement the lateral space value for one O can be found and then the lateral space value for the W can be determined by subtracting the lateral space value for one O from the distance between the centres of the O's with the W between them as already determined.

The lateral space values for the other letters of the alphabet are determined in the same way as the O and the W.

The reason for selecting an O and an I for determining the lateral space values is that the O and I, are symmetrical and can be placed on either side of the character to be spaced, and the widest character is spaced first to determine a suitable spacing between the O's and the I's.

The optical centre of each character as judged by the eye can be measured as being half-way between the centres of the two O's when the O's and I's are in position as before on either side of the character.

The lateral space values for all the arbitrary characters are tabulated.

The next step is to determine the light value for each arbitrary character.

Each character is drawn in black on a white background and a photographic negative, enlarged if necessary or desired, is produced as shown in FIGURE 4.

The negative is then placed in the apparatus shown in FIGURE 5 which comprises a light source 10, a frosted glass plate 11, an opal screen 12 covering an opening in a box 13, a light responsive cell 14 which is responsive to the level of illumination in the box from light entering through screen 12 and a galvanometer 15 giving readings according to the cell response.

The negative 18 is placed above the screen 12 and a light wedge 19 is placed between the negative and the plate 11.

The light wedge comprises a glass plate or a film which has an optical density increasing from a minimum at its margins to a maximum at its centre and is illustrated diagrammatically in FIGURE 6. The centre of the plate is preferably wholly dark. The wedge of FIGURES 5 and 6 allows light to pass through it such that the amount of light at any point on the wedge is a function of the lateral distance of the point from the axis 20 of the wedge. Accordingly the light in the box 13 is a function of the second moment of the character about the axis 20.

The negative 18 is placed in such a position with respect to the wedge 19 that if the wedge is covered first on one side and then on the other side of the axis 20 by means of a hinged plate 21 the reading of the galvanometer is the same. The plate 21 is then removed and the galvanometer 15 reading is taken giving the light value of the character for the particular apparatus.

The light values of all the characters are read using the same apparatus and then tabulated.

The light values of the characters are then plotted against the respective lateral space values on a graph.

When it is desired to space another set of characters each character of the other set is put in the apparatus of FIGURE 5 and the light value of each character is read off from the galvanometer.

The lateral space value of each character is then read off from the graph, and can be used to manufacture character bearing faces with widths corresponding to the lateral space values of the respective characters on the parts. The characters are set on the parts with the optical centres of the characters at the centres of the widths of the parts.

Various modifications may be made to the method described above without departing from the scope of the invention. In particular the light wedge need not be exactly as described.

For example the light wedge may be constructed to allow light to pass through so that the intensity of the light at any point is a function of the second or third power of the distance of the point from the central axis of the wedge, or the intensity may be a function of a power between the second and third power of the said distance.

Alternatively the light wedge may be a circular wedge where the intensity of the light passing through the wedge is nil at the point centre of the wedge and increases radially in all directions from the point centre as some function of the distance from the centre.

In this case it is necessary to centre the negative in the apparatus in two perpendicular directions instead of the one direction as already described. This can be effected by using four hinged plates 21 each covering one quarter of the wedge. The plates are raised and lowered in pairs to obtain equal readings of the galvanometer as before by sliding the negative in the direction perpendicular to the division between the pairs. The operation is then repeated using the plates in their other pairs and by sliding the negative in the other perpendicular direction.

With each different wedge so used there will be a graph of light values against lateral space values peculiar to the wedge used and it is necessary to use the right graph for the particular wedge in use when spacing a set of characters using a wedge and a graph.

FIGURE 7 shows a line of characters spaced according to the invention and FIGURE 8 shows a typical graph of lateral space values plotted against light values. The actual graph shown is for a third moment wedge (i.e. a wedge in which the light allowed to pass through any point on the wedge is proportional to the third power of the lateral distance of the point from the centre of the wedge) and was plotted using a "Grot 215" alphabet as the arbitrary set of characters.

In recent years there has come into widespread use so-called transfer lettering sheets. These consist essentially of a support, a plurality of character indicia in printing ink carried on the carrier sheet and adhesive covering at least the surface of such character indicia, the whole being so constructed and arranged that each individual character indicium may be separately transferred at will onto a receptor sheet, to which it is made adherent by reason of the adhesive referred to. Particular forms of such products are described in British patent specifications Nos. 90,634, 954,459, and 959,670. In one very valuable form the product comprises a support sheet consisting of a transparent or translucent extensible film, character indicia in film forming printing ink carried on said film and a substantially non-tacky adhesive applied over the whole of the indicia and overlapping onto the support sheet, it being arranged that the character indicia are released from the support sheet by a local stretching of the support sheet (e.g. by rubbing over the area of the indicia on the reverse side of the sheet with a stylus or other hard instrument), the adhesive is such that adherence to a receptor sheet does not take place at pressures below 2 p.s.i. but does take place at pressures above 50 p.s.i., and the adhesive is preferably such that it shears round the indicia when they are transferred so that adhesive is not transferred (or is transferred only to a very limited extent) in the area round the transferred indicia.

Many other forms of transfer are of course possible, including forms based on adhesives which are solvent (e.g. water) activated or heat activated.

These materials, especially such as carry indicia which are letters or numerals, may be used to build up words or complex figures on a receptor sheet, e.g. in the making of textual copy. A problem which arises, however, is that it is left to the user of the sheets to space the letters or numerals as they appear on the receptor sheet and the average user is not usually sufficiently skilled to achieve an optimum spacing "by eye," which is the only method available to him.

The method of spacing a set of characters according to the present invention provides a means for overcoming this difficulty by enabling the determined lateral space values to be identified on the transfer sheets for the guidance of the user.

According, therefore, to a further aspect of the present invention there is provided a transfer material which comprises a transparent or translucent support sheet, a plurality of character indicia carried by said support sheet and separately transferable from said support sheet, and guide marks carried on said sheet and associated with each of said character indicia which define the lateral space value of each character, the said lateral space values being determined by the process defined above.

Figure 9:
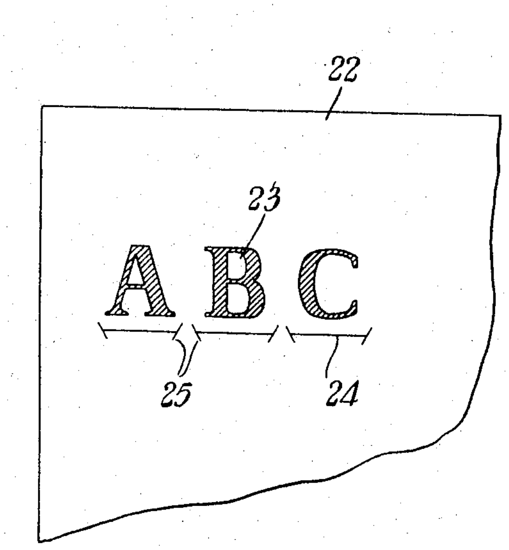
Figure 10:
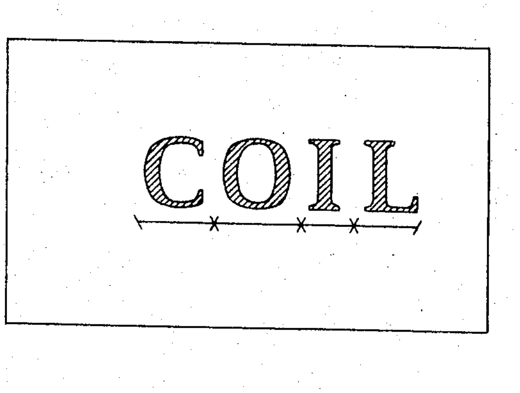
Figure 11:
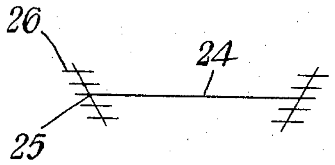

A typical form of such transfer material, and its method of use, is illustrated in FIGURES 9–11 of the accompanying drawings in which:

FIGURE 9 shows a portion of a transfer sheet carrying transferable letters.

FIG. 10 shows letters transferred onto a receptor sheet.

FIG. 11 shows an alternative form of a detail of FIGURE 9.

Referring to FIG. 9 the support sheet 22 carries on one face a plurality of character indicia 23. Below each character on the sheet is a line 24 which defines the lateral space value of the character. The lines 24 differ in length and position relative to the character in accordance with each particular character. For convenience the ends of the line are marked with obliques 25.

In use the user places the transfer sheet over the receptor surface and transfers a single character 23 (e.g. the letter C) at the same time transferring the guide marks 24 and 25 associated with that letter. He then moves the transfer sheet to bring the next desired character 23 into position (e.g. the letter O) and he defines the position by superimposing the right hand oblique 25 of the letter C onto the left hand oblique of the letter O (so that the obliques cross) while keeping the marks 24 in line. By repeating this process with subsequently desired letters (e.g. I and L) he is enabled to make up the desired word (e.g. COIL) on the receptor sheet with each of the letters spaced according to their lateral space values as shown in FIGURE 2.

When the operation is completed the user can readily erase the transferred marks 24 and 25.

It will be appreciated that the provision of such guide marks on a transfer sheet of the character, for example, described in British patent specification No. 959,670 the usage of the transfer sheet is very greatly facilitated.

A variation in the line-and-oblique method of providing the guide marks is illustrated in FIGURE 11, which differs from the method shown in FIGURE 9 in that the obliques 25 have horizontal lines (laterals) 26 drawn as shown. This form of guide mark is used in the same way as the guide marks of FIGURE 1 but by making selective use of the cross-points of the laterals 26 and obliques 28 either standard, condensed or expanded spacing may be achieved, thereby affording a further degree of freedom to the user.

I claim as my invention:

1. Transfer material comprising:

(a) a light-transmitting support sheet, (b) a group of character indicia including laterally asymmetrical indicia on and visible through said support sheet and transferable therefrom, and (c) guide indications associated with each of said indicia on and visible through said support sheet and transferable therefrom for laterally spacing such indicia when transferred from said support sheet to a surface, (i) each laterally asymmetrical indicium having an axis dividing the indicium into two equally weighted areas respectively on each side of the axis, said areas being weighted according to the respective distances from the axis of the elemental area portions making up such areas, the weighted value for each portion increasing with the respective distance of such portion from the axis, (ii) said axis being centrally disposed relative to the guide indications corresponding to each indicium, and (iii) the magnitude of said guide indications being a predetermined function of said weighted areas.

2. Transfer material as claimed in claim 1 wehrein said predetermined function of said weighted areas is a correlation between the lateral spacing and corresponding weighted areas of a second group of similar reference indicia having desired lateral spacing of the indicia.

3. Transfer material as claimed in claim 2 wherein the weighted value of each elemental area portion is the multiple of the area of such portion times a positive power in the range of the first to the third power of the distance of such portion from the axis.

4. Transfer material comprising:

(a) a light-transmitting support sheet, (b) a group of character indicia including laterally asymmetrical indicia on and visible through said support sheet and transferable therefrom, and (c) guide indications associated with each of said indicia on and visible through said support sheet and transferable therefrom for laterally spacing such indicia when transferred from said support sheet to a surface, (i) each laterally asymmetrical indicium having a centroidal axis dividing the surface area of said indicium into two areas having substantially equal second moments about said axis, (ii) said axis being centrally disposed relative to the guide indications corresponding to each indicium, and (iii) the magnitude of said guide indications being a predetermined function of the value of said second moments.

5. Transfer material as claimed in claim 4 wherein said predetermined function of said second moment value is a correlation between the lateral spacing and corresponding second moment values of a second group of similar reference indicia having desired lateral spacing of the indicia.

References Cited

UNITED STATES PATENTS

| | | | |
|---|---|---|---|
| 2,800,062 | 7/1957 | Rondthaler | 95—4.5 |
| 2,890,634 | 6/1959 | Rondthaler | 95—4.5 |
| 2,970,043 | 1/1961 | Serafin | 283—1 |

JOHN M. HORAN, *Primary Examiner.*